United States Patent Office 2,992,958
Patented July 18, 1961

2,992,958
METHOD OF WELDING NYLON AND SIMILAR FABRICS MADE OF SYNTHETIC FIBERS BY HIGH FREQUENCY ENERGY
Sakuji Yamaguchi, 5, 2-chome, Enjo-cho, Showa-ku, Nagoya City, Japan
Filed Aug. 16, 1957, Ser. No. 678,601
4 Claims. (Cl. 154—126.5)

This invention relates to an improvement in the method of welding nylon and other similar fabrics made of synthetic fibers by means of high frequency electric energy and also to a device for carrying out the method.

High frequency welding of plastic films such as vinyl films has already been fully investigated and is well known, but the high frequency welding of nylon and similar synthetic fabrics has not been successful industrially perhaps due to its difficulty and to insufficient investigation. Though the method of high frequency welding of nylon filaments themselves can be accomplished, yet the filaments constituting a fabric are fused and detteriorated so that the fabric does not have the strength of the filament and is very low as found by the tension test. Nylon fabric, for instance, taffeta, 0.15 mm. thick and 3 cm. wide, which is line welded, is broken at 2-3 kgs. by the tension test.

On the other hand, the same fabric sewn by threads has a tensile strength of more than 8 kgs. Nylon fabric welded by high frequency electric energy should have at least the same or higher strength than sewn fabrics, otherwise the welding has no practical value.

Sewing of nylon fabrics has been studied and seems to be almost perfect, yet the nylon fabric sewn by threads has the defects of shrinkage at the sewn place if the fabric is washed in water, and that the sewn joint becomes often frayed or frazzled if the nylon fabric is subjected to the action of an electric washing machine, more particularly of the jet type, and if a part of the sewn joint becomes loose the looseness is transferred to the remaining joints. Moreover the sewing by threads should be effected along bias of the fabric, i.e. in a direction inclined to the woven texture so that the sewing and cutting become more difficult.

The object of this invention is to obviate the above disadvantages and provide means for carrying out the method of high frequency electric welding of nylon and similar fabrics very easily and favourably.

In accordance with this invention, it was found that the object can be attained by giving artificially a suitable wetness to the cloths to be welded by high frequency electric energy. In other words, if the high frequency welding is applied to nylon or similar fabrics which are moistened with water the fabrics can be united together perfectly with very neat appearance. According to the same idea, fabrics of synthetic fiber other than nylon such as so-called "Terylene" (polyethylene-terephthalate) can be very easily welded by high frequency electric energy, and also fabrics made of polyvinyl alcohol filaments, cellulose acetate filaments can be welded by high frequency electric energy to a certain extent.

If water is added together with glycerin or other similar agent to keep wetness for a comparatively long time easier operation can be attained with better result and the welding strength increases about two times. An agent serving to increase the conductivity of the water also may be added.

If we try to effect high frequency welding of dry Terylene fabrics without any treatment with water, there occurs continuous sparks so that the welding is impossible. On the contrary, if the Terylene fabrics are wetted with water they can be welded together easily and perfectly without causing any spark. The theoretical reason of the above is not yet known, but it may be assumed that the moisture increases the dielectric constant for generating heat by absorbing high frequency wave.

Another important feature of this invention is the use of spot welding with a special shape and arrangement of the welding spots, and in the preferred embodiment of this invention each of the welding spots is made an ellipse or diamond shape with concave and rounded depression without any sharp corner.

Reference is taken to the accompanying drawing for a better understanding of the present invention when considered in connection with the following detailed description as particularly applied to the welding of nylon fabrics, in which.

Figure 1:
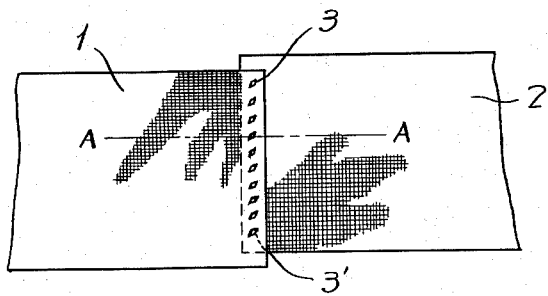
FIG. 1 is a plan view of a piece of high frequency welded nylon fabrics in an enlarged scale showing an embodiment of this invention.
Figure 2:
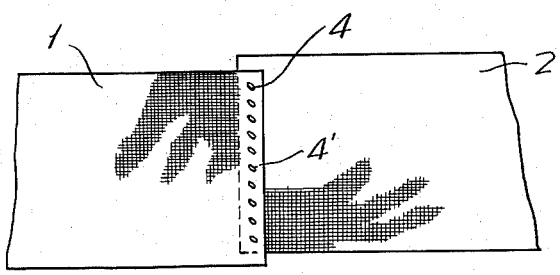
FIG. 2 is a similar view to FIG. 1 showing a different shape of welding spots as another embodiment of this invention.
Figure 3:
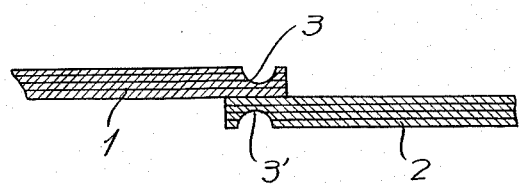
FIG. 3 is a sectional view through the line A—A of FIG. 1.

Referring to FIGS. 1 to 3 of the drawing, 1 and 2 designate nylon fabrics to be welded together by high frequency electric energy. According to this invention, spot welding is adopted and the shape of each spot 3 is selected as diamond shape as shown in FIG. 1, and the optimum result is obtained if it is arranged obliquely with respect to the center line of the welding seam.

In the embodiment of this invention as shown in FIG. 2, the spots 4 are made elliptic or elongated elliptic shape. The maximum tensile strength is obtained by arranging the major axis of each diamond or elliptic shaped spot with some angle to the welding seam, and the next best result can be obtained by arranging the major axis of each spot along the direction of the warp of the fabric. Moreover the surface of the spot electrode should have a smooth curvature to produce curved depressions 3 and 3' when welded, as shown in FIG. 3.

Figure 4:
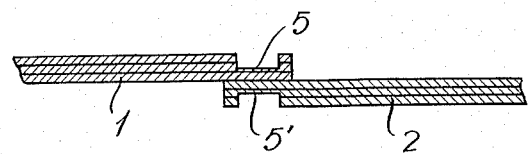
FIG. 4 is a similar view to FIG. 3 showing an undesirable shape of the welding spots for the sake of comparison.

Spot welding electrodes having sharp edges which produce spot depressions 5 and 5' having sharp corners as shown in FIG. 4 are not good and result in a decrease in strength.

The actual test results show that the welded joint of 3 cm. breadth taffeta made according to the method of this invention as shown in FIGS. 1 and 3 can resist more than 10 kgs. The distance between two adjacent spots depends on the nature and thickness of fabric. For a taffeta fabric, 0.15 mm. thick, about 1 mm. pitch is suitable and it is necessary to use smaller pitch for thinner fabrics.

What I claim is:

1. A method of welding fabrics made of synthetic fibers which comprises spot welding the fabric between electrodes by applying high frequency electric energy to at least two superposed layers of fabric while they are held stationary relative to the electrodes and are moistened with an aqueous liquid selected from the group consisting of water and mixtures of water and glycerine.

2. A method as defined in claim 1 in which the aqueous liquid used for moistening is water.

3. A method as defined in claim 1 in which the aqueous liquid used for moistening is a mixture of water and glycerine.

4. A method according to claim 1, which comprises welding said moistened fabrics together by a number of spaced spots, each having an elongated shape and a smoothly curved surface and arranged at a small angle to the direction of the welding seam.

References Cited in the file of this patent

UNITED STATES PATENTS

| | | |
|---|---|---|
| 2,457,659 | Graham | Dec. 28, 1948 |
| 2,473,251 | Hsu | June 14, 1949 |
| 2,550,006 | Dreyfus | Apr. 24, 1951 |
| 2,570,921 | Collins | Oct. 9, 1951 |
| 2,621,138 | Messing | Dec. 9, 1952 |
| 2,711,828 | Webb et al. | June 28, 1955 |
| 2,715,597 | Hosfield | Aug. 15, 1955 |
| 2,730,481 | Day | Jan. 10, 1956 |
| 2,734,982 | Gillespie | Feb. 14, 1956 |
| 2,764,862 | Rado | Oct. 2, 1956 |
| 2,850,422 | Welch | Sept. 2, 1958 |
| 2,859,153 | Zucht | Nov. 4, 1958 |